No. 689,370. Patented Dec. 17, 1901.
M. SLOTKIN.
POWER TRANSMITTING MECHANISM.
(Application filed June 19, 1901.)
(No Model.) 2 Sheets—Sheet 2.
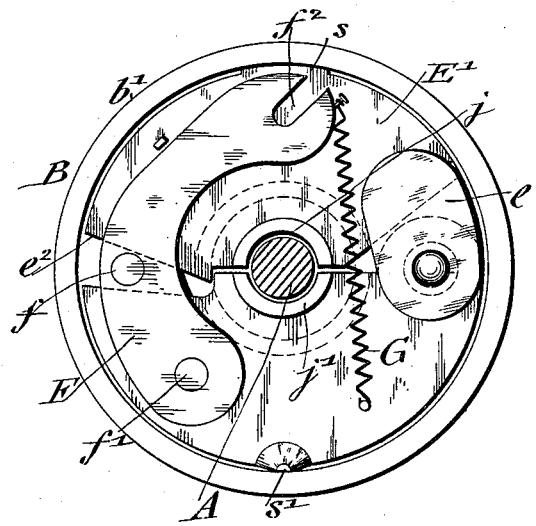
Fig: 5.
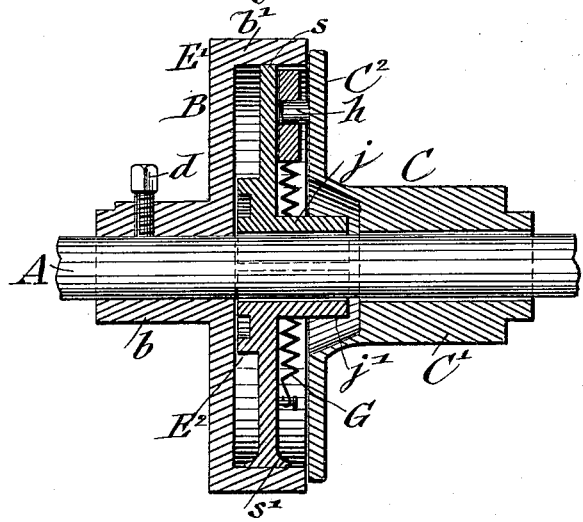
Fig: 6.

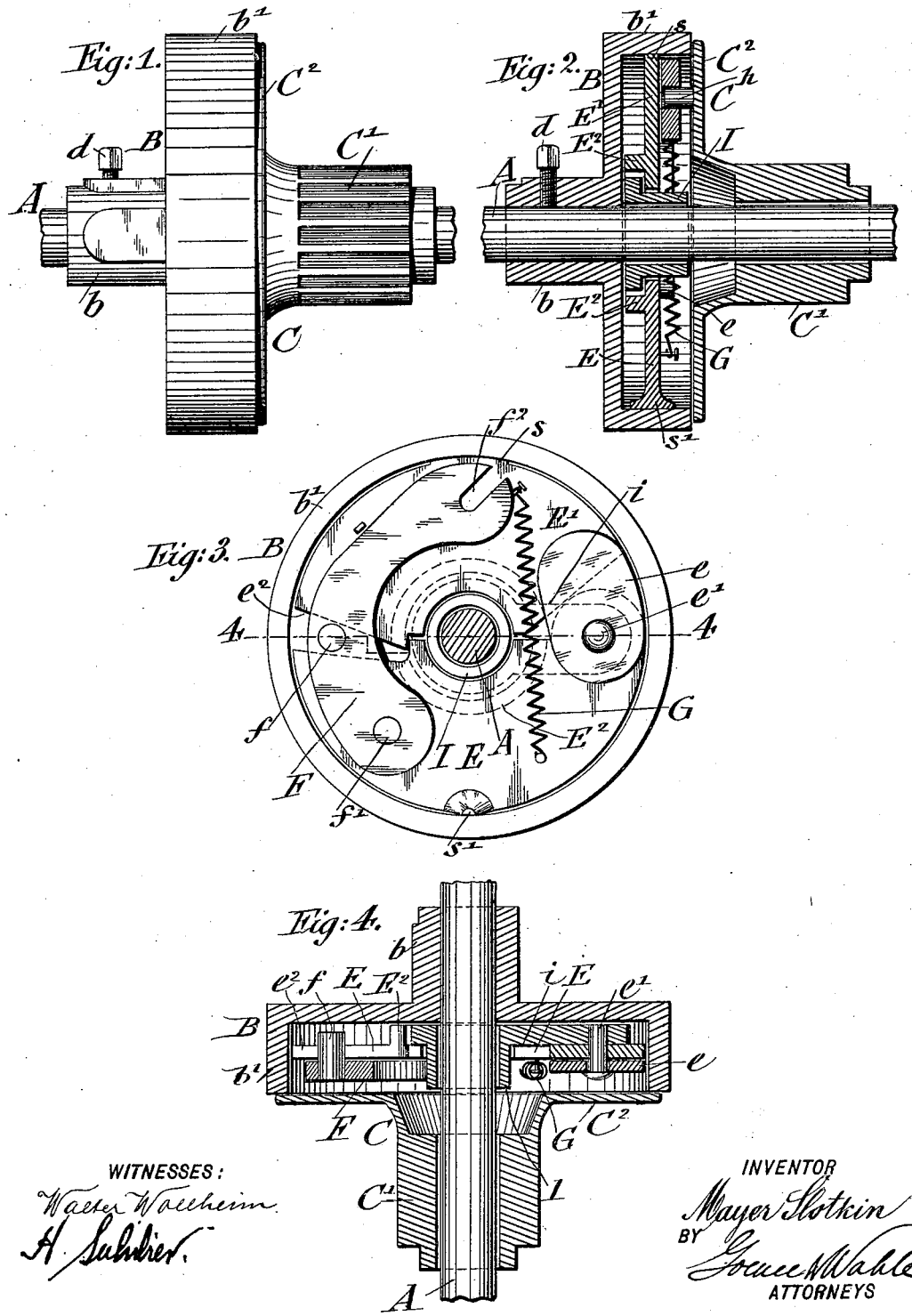

UNITED STATES PATENT OFFICE.

MAYER SLOTKIN, OF NEW YORK, N. Y., ASSIGNOR OF ONE-HALF TO JULIUS PRAGLIN, OF NEW YORK, N. Y.

POWER-TRANSMITTING MECHANISM.

SPECIFICATION forming part of Letters Patent No. 689,370, dated December 17, 1901.

Application filed June 19, 1901. Serial No. 65,167. (No model.)

*To all whom it may concern:*

Be it known that I, MAYER SLOTKIN, a citizen of the United States, residing in New York, borough of Manhattan, in the State of New York, have invented certain new and useful Improvements in Power-Transmitting Mechanisms, of which the following is a specification.

This invention relates to a power-transmitting mechanism or clutch of that class in which oscillatory motion is converted into continuous rotary motion; and the object of the invention is to provide a power-transmitting mechanism or clutch which is particularly adapted for use with polishing-machines, sewing-machines, and the like and which mechanism or clutch is provided with a minimum of parts and is so constructed as that it will be effective and durable in use.

My invention consists of certain features of construction and combinations of parts to be hereinafter described and then claimed.

In the accompanying drawings, Figure 1 is a side elevation of my improved power-transmitting device or clutch. Fig. 2 is a vertical central section thereof. Fig. 3 is a sectional front elevation of the interior parts, the pinion member of the device or clutch being removed. Fig. 4 is a cross-section on the line 4 4, Fig. 3, parts being in elevation. Fig. 5 is a sectional elevation, the pinion member being removed, showing a modification of the invention; and Fig. 6 is a section of said modification, showing the pinion member in position.

Referring to the drawings, A indicates the shaft to be driven by continuous rotary motion.

B indicates the shaft member of the clutch or device, and C indicates the pinion member. The shaft member B is provided with a hub $b$, which is provided with a screw-threaded hole, in which is set against the shaft A a set-screw $d$, whereby the shaft member is rigidly secured to the shaft A. The shaft member B is provided with a casing portion or box $b'$, in which the interior assembled parts of the mechanism or clutch are located. The pinion member C consists of a pinion $C'$, which is provided with a face-plate or disk $C^2$ of approximately the same diameter as the shaft member B, and the periphery of the said face-plate or disk lies adjacent to and in contact with the edge of the casing or box portion $b'$ of the shaft member.

The interior mechanism of the clutch consists of a number of parts all assembled together and attached and separately removable from the casing or box $b'$.

E E' indicate segmental friction-plates, which combined are substantially the interior diameter of the box or casing $b'$, and one of which segmental plates is provided with a leaf or wing $e$, which is solidly brazed or cast therewith and which is connected with the adjacent end of the segmental plate E by means of a pivot $e'$, the other ends of the segmental plates being free and the end of the plate E' having an incline or slant $e^2$. The pin $f$, which is carried by a curved or bent lever F, pivoted to the plate E at $f'$, is adapted to ride or bear on the inclined end $e^2$ of the other segmental plate E'. The free end of the lever F is provided with a slot or notch $f^2$ and is connected with the segmental plate E by means of a tension-spring G. The tendency of this spring is to draw the lever F inwardly.

$h$ indicates a pin on the face plate or disk $C^2$ of the pinion member, which pin is received by the slot or notch $f^2$ of the lever F.

Pivoted to the plate E by means of the above-mentioned pivot $e'$ is a centering eye or collar I, which is provided with an arm $i$, through which the said pivot passes. The said collar I projects through the opening formed at the center of the segmental plates and is partially surrounded by concentric ribs or flanges $E^2$, formed adjacent thereto on the segmental plates. The shaft A passes through the hub $b$ of the shaft member, through collar I, and through the hollow pinion $C'$ of the pinion member, so that the device is properly centered upon the said shaft. When the parts are in the position as stated, the pin $h$ will be received in the slot or recess $f^2$ of the lever F. Said segmental plates are provided with friction shoes or surfaces at $s\ s'$, respectively, the shoe $s$ on the segmental plate E' being formed by raising the edge of the said plate slightly, whereas the shoe $s'$ is formed by means of a boss or enlargement, which extends laterally from both sides of the segmental plate E.

A modified form of the invention is shown in Figs. 5 and 6, in which instead of the collar I, which receives the shaft and centers the internal parts of the device, the segmental plates E E' are provided with semicircular projections $j\,j'$, which form a split hub for the said segmental plates and which surround the shaft A. In this form of the invention the separately-pivoted collar or eye I is unnecessary; but the other parts of the invention are the same.

The operation of the described power-transmitting device or clutch is as follows: Motion is imparted to the pinion C' by a suitable gear, which imparts oscillatory rotary motion to the same and to the face plate or disk $C^2$, so that at each impulse of the disk $C^2$ a corresponding impulse is imparted to the lever F, so that in one direction of the motion of the pinion member the pin $f$ on the lever F is forced in contact with the inclined end $e^2$ of the segmental plate E', thereby separating the segmental friction-plates E E' slightly and causing their shoes $s\,s'$ to ride on or frictionally contact with the inner circumference of the box or casing $b'$ of the shaft member and imparting a rotary impulse to the shaft A, and each time one of these impulses is imparted to the shaft A it is imparted in the same direction, so that consequently a continuous rotary motion is imparted to the shaft. Each time a rotary motion is imparted to the pinion member in opposite direction the lever F is acted on so as to release the pin $f$ from the inclined edge $e^2$, thereby permitting the spring G to draw the segmental plate E away from frictional contact with the shaft member, this action resulting in withdrawing the segmental plate E' from frictional contact also with the shaft member. The result is that the back-and-forth motion of the pinion member is converted into continuous rotary motion in the shaft member.

The parts of my improved power-transmitting device or clutch are comparatively simple, and the same is not liable to get out of order and is always reliable and quick in action. Also as the interior operative parts are all assembled together they can be bodily removed as a whole or replaced when desired.

Having thus described my invention, what I claim as new, and desire to secure by Letters Patent, is—

1. In a power-transmitting device or clutch, the combination, with the shaft to be driven, the shaft member fixed on the shaft and the pinion member loose on the same, of segmental friction-plates arranged loosely within the shaft member and suitably pivoted at one end, their opposite ends being free, and the free end of one of the segmental plates having an incline or slant, a lever pivoted to the other segmental plate, a pin on said lever adapted to bear upon said incline or slant, a spring acting on the lever, and suitable means for connecting the pinion member with the free end of said lever, substantially as set forth.

2. In a power-transmitting device or clutch, the combination, with the shaft to be driven, the shaft member rigidly secured to the said shaft, and the pinion member loose on the said shaft, of segmental friction-plates arranged loosely in the shaft member and adapted to bear frictionally upon the inner circumference of the same, said segmental plates being pivoted together at one end, and free at the other end, the free end of one segmental plate having an incline or slant, a lever pivoted to the other segmental plate and provided with a pin adapted to bear upon said incline or slant, its free end being provided with a slot or recess, a spring connecting the free end of the lever with the segmental plate to which it is pivoted, a pin on the pinion member engaging in the slot or recess of the said lever, and a centering collar or eye suitably pivoted to one of said segmental plates, substantially as set forth.

In testimony that I claim the foregoing as my invention I have signed my name in presence of two subscribing witnesses.

MAYER SLOTKIN.

Witnesses:
PAUL GOEPEL,
GEORGE GEIBEL.